March 2, 1926.   W. DUBILIER   1,575,044
ELECTRICAL CONDENSER
Filed May 24, 1921
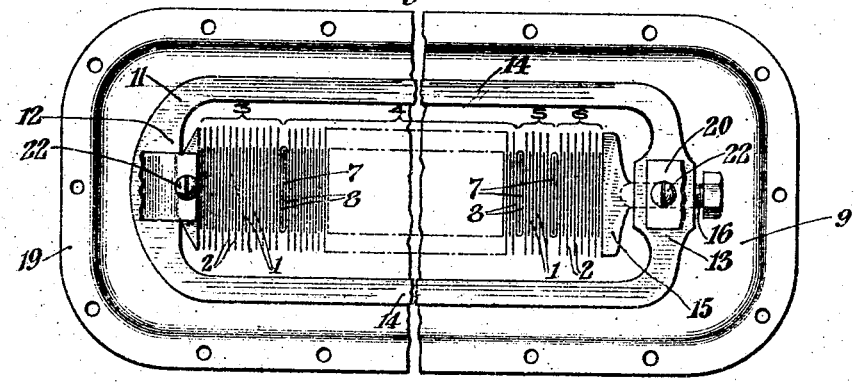
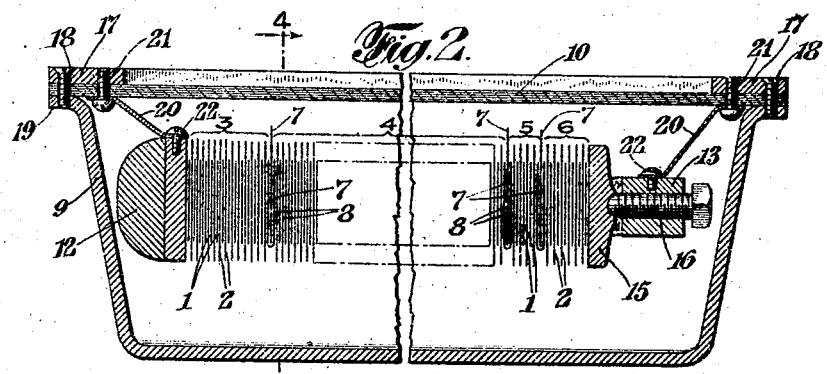
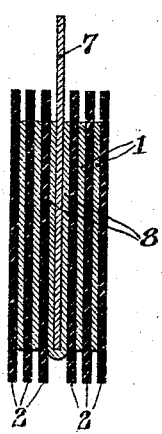
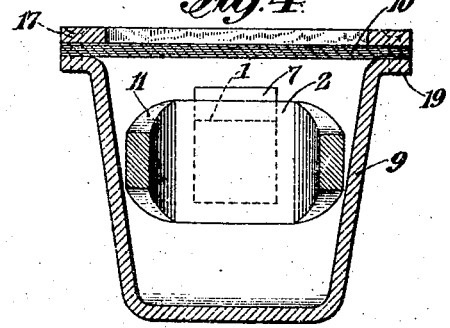
William Dubilier Inventor.
By his Attorneys
Prindle, Wright & Small.

Patented Mar. 2, 1926.

1,575,044

UNITED STATES PATENT OFFICE.

WILLIAM DUBILIER, OF NEW YORK, N. Y., ASSIGNOR TO DUBILIER CONDENSER & RADIO CORPORATION, A CORPORATION OF DELAWARE.

ELECTRICAL CONDENSER.

Application filed May 24, 1921. Serial No. 472,105.

*To all whom it may concern:*

Be it known that I, WILLIAM DUBILIER, a citizen of the United States, residing at New York, in the county of New York and State of New York, have invented a certain new and useful Electrical Condenser, of which the following is a specification.

The invention has for an object to provide an electrical condenser involving the use of but a relatively small quantity of dielectric and conducting material, and of simple structure, which nevertheless will be capable of withstanding use in high potential and high frequency circuits without the production of undue resistance losses, brush discharge, heating or other undesirable effects tending to injure or destroy the same.

Further objects and advantages of the invention will be in part obvious and in part specifically pointed out in the description hereinafter contained, which, taken in connection with the accompanying drawings, discloses a preferred embodiment thereof; such embodiment, however, is to be considered merely as illustrative of its principle. In the drawings:

Fig. 1 is a plan view of a condenser made in accordance with the invention held in a suitable clamp, and in position in its casing.

Fig. 2 is a side view of the structure shown in Fig. 1, a portion of the clamp being cut away for clearness.

Fig. 3 is a fragmentary sectional view showing a form of tap or lead which may be used in connection with the condenser.

Fig. 4 is a section on line 4—4 of Fig. 2.

When condensers are designed for use in high potential or high frequency circuits, it is desirable to bring about a subdivision of the potential between different parts of the condenser, in such manner that the strain at any given part will be reduced sufficiently to enable the condenser to stand long continued use without undue deterioration due to brush discharge, heating, or other causes. Furthermore, the conducting armatures or plates of condenser should be capable of carrying the current for which it is designed, without the production of sufficient heat to injure the condenser; in other words, the conducting plates should be of relatively low resistance.

If a condenser of the above character be made up by constructing condenser sections having a plurality of conducting plates of opposite polarity interleaved with dielectric sheets, and connecting in series a plurality of such sections, it is necessary to employ several conducting sheets in each section to give the section sufficient thickness and strength to be handled without too great risk of injury; also the current travels through the connected sections in the plane of the conducting plates, or through the sheets from end to end, thus following a path of high resistance, so that, for this further reason a substantial number of sheets in parallel are usually needed in each section to reduce the internal resistance of the condenser to a value low enough to prevent heating to an undesirable degree.

From the above and other considerations it may result, particularly where condensers of low capacity are desired, that individual sections of the character above described necessarily will have such large capacity, that an unduly large number of such sections will have to be connected in series to reduce the capacity of the complete condenser to the desired value and yet retain sufficient conductivity in the plates. Thus the condenser becomes of large size, and involves increased expense on account of the amount of dielectric and conducting material used, and the added labor of preparing and properly assembling the same.

According to the present invention, the conducting plates of the condenser are so arranged that the current flows transversely through the same, instead of from end to end, thus greatly reducing the length of the path of current travel and increasing the cross-section of conductor; therefore the capacity of the unit elements of the condenser may be made much smaller, and a smaller number of unit elements in series employed, without encountering the trouble of too much reduced conductivity.

Referring to Figs. 1 and 2, the condenser may be made up of a plurality of conducting plates 1, preferably of soft metal such as tin foil cut into rectangular form, and interleaved with larger dielectric sheets 2 which I prefer to make of sheet mica, and built up into a stack. Circuit is made to the plates 1 which are at opposite ends of a series, and the intermediate plates are completely insulated, so that the dielectric sheets 2 may be permitted to overlap such plates on all four sides. Thus the intermediate plates act as floating capacities between the end plates, and the total potential will be divided between all the plates, each pair of adjacent plates acting as a unit condenser. The current path is in a direction transverse to the plane of the plates, and the cross-section of the conductive path equals the length of the plate multiplied by its width, instead of the width of the plate multiplied by its thickness; the increased conductivity may be compared to what would be obtained by passing current across an extended conductor, instead of along its length. Also the length of the path of current travel is a function of the thickness of the plates, instead of their length. With the condenser constructed in the above manner, the internal resistance therefore is exceedingly low, and it is not necessary to use a large amount of conducting material with the added dielectric sheets which would be required, to carry the current. Thus only that number of plates in series need be used which is considered necessary to reduce the voltage per unit condenser to a value which is considered safe, and each additional sub-division of voltage involves only one additional conducting plate, and one dielectric sheet.

The required capacity and the potential of the circuit in which the condenser is to be used being known, the number of unit condensers necessary to be connected in series may be selected, and a size of conducting plate adopted which will give approximately the desired capacity when the selected number of unit condensers are placed in series. Then by adding or removing one or more conducting plates, if necessary, the final capacity may be brought within the required limits, without unbalancing the distribution of potential over the unit condensers.

The number of unit condensers employed in series for any given condenser, should be such as to reduce the potential per unit condenser to a value below the brush discharge point. I prefer to employ as the dielectric, unitary mica sheets averaging about three-thousandths of an inch in thickness, in which case the potential per unit condenser should not rise above a value in the neighborhood of 1000 or 1500 volts maximum, and in certain cases, particularly where the condenser is to be subjected to undamped oscillations, I prefer to reduce the potential to a value around 600 or 800 volts maximum.

Furthermore, in order to eliminate air, vacua, moisture, etc., and to render the dielectric as homogeneous as possible, I prefer to impregnate the condenser thoroughly with a heated insulating composition such as melted paraffin, or other suitable compound, and subject the same to the action of a vacuum, after which the stack should be placed under a high compression of several tons, to press out substantially all the insulating compound from between the conducting plates and dielectric sheets, and bring about an intimate surface contact between the same.

In some instances condenser stacks of the character above described may be made up in one or more groups of standard sizes containing convenient numbers of condenser units in series, and several such stock condenser stacks combined in series or parallel to make up a desired condenser. For example, where high potential condensers of very small capacity are desired such as may be used with radio sets of the vacuum tube type, several standard groups may be placed end to end, thus forming a composite block containing a proper number of unit condensers in series and having the desired low capacity. The form of condenser illustrated consists of a plurality of series groups 3, 4, 5 and 6 which may be of the same or different individual capacities, as desired, and any desired number may be employed to build up a complete stack. As shown, a plurality of taps 7 are interposed between the several groups 3 to 6 and thus, by making the circuit connections to different taps, different capacities may be obtained. The taps 7 conveniently may be made in the form of copper strips overlapped by the dielectric sheets 1 on three sides, but projecting beyond the latter on the fourth side, and plates 8 of tin foil, similar to the plates previously described, may be placed on opposite sides of taps 7 to facilitate the making of an intimate contact between the conducting material associated with taps 7 and adjacent dielectric sheets 2. Thus the taps need not render the stack loose or otherwise defective at the points from which they lead.

The condenser should be securely clamped to insure that the sheets will be held throughout in intimate surface contact as mentioned above, after the condenser has been put into actual use.

According to the present invention, I place the stack within a casing 9, preferably of metal, with the sheets making up the stack disposed substantially parallel to the end walls of the casing, the taps 7 projecting upwardly toward the open side of the casing. Thus one or more terminal connections for the condenser may be led through the cover 10 of the casing in any suitable manner (not shown) to connect with the taps. The condenser is surrounded by clamp 11 which fits within the side walls of casing 9, and thus the condenser may be assembled into proper position within the clamp and the latter inserted into or withdrawn from the casing without disturbing the stack. The clamp consists of the bearing members 12 and 13 at opposite ends of the stack, and the tension members 14 extend between the bearing members to transmit the strain from one end of the stack to the other; I prefer to make up the clamp from one continuous piece of metal such as spring steel, which may be drop-forged, punched or pressed into proper shape. The bearing block 15 may then be interposed between one bearing member 13 and the adjacent end of the stack, and the compression applied to the stack at a point substantially in line with the centre by means of a binding member such as the stud 16 threaded through bearing member 13 and pressing on block 15. Thus the block 15 will exert substantially uniform pressure upon the stack throughout the entire area and will not tend to bow or warp. The opposite bearing member 12 may be made heavy enough to insure that its surface which presses against the stack will be substantially flat. With proportions similar to those shown in the drawings, the bearing member 12 will be relatively rigid, and any changes in shape in the clamp which may occur due to the springiness of the material, when stud 16 is tightened up, will take place in its thinner portions, particularly where tension members 14 join on to the bearing member 13, without affecting the condenser stack detrimentally.

Where the stack is combined with a clamp of the above character, the clamp or the casing or both may form one terminal of the condenser, or the clamp may be completely insulated, if desired. It will be noted that the clamp acts to bridge electrically the space between the groups 3 and 6, and thus if the taps 7 at opposite ends of group 4 are connected to opposite circuit terminals, groups 3, 5 and 6 will be in parallel with group 4 between the terminals. This arrangement may be adopted to give a relatively large capacity, or, if desired the sections 3, 5 and 6 may include such large numbers of unit condensers in series that the capacity of groups 3, 5 and 6 in series is negligible as compared to the capacity of group 4, so that the resultant capacity is substantially that of group 4 alone. Similarly the number of unit condensers in series in group 4 may be so large as compared to groups 3, 5 and 6 that the capacity of group 4 may be disregarded, the number of unit condensers in the different groups 3 to 6 as illustrated not being in any way essential.

In mounting the condenser stack and its clamp within the casing 9, I prefer to place the clamp parallel to the bottom of the casing in such manner that taps 7 will project upwardly toward the cover 10. Particularly where the condenser is to be subjected to undamped oscillations, I prefer to construct the cover 10 of mica sheets impregnated with an insulating compound such as paraffin, and pressed together as closely as possible to form a homogeneous sheet which may be suitably held in position over the casing 9 as by means of a metal ring 17 and screws 18 which clamp the cover 10 between such ring and a shoulder 19 running around the upper edge of the casing.

In order to facilitate the positioning of the clamp and condenser stack within the casing, the clamp may be attached to the cover before the latter is affixed to the casing; this is accomplished in the present instance by a pair of straps 20 of thin metal or the like secured to the under side of the cover by means of screws 21, and to the clamp by further screws 22. Thus the condenser clamp and stack may be positioned properly with respect to the cover, and when the latter is secured to the casing 9 the condenser stack will be properly located in the casing without further adjustment. Ordinarily the casing will be filled with insulating compounds such as paraffin, and the straps 20 thus serve to hold the condenser in suspension in the insulating compound until the latter solidifies. In cases where the casing or clamp are included in circuit with the condenser stack, the straps 20 also may act as circuit connections thereto.

While a specific embodiment of the invention has been described, it will be obvious that many changes may be made therein without departing from the spirit of the invention as defined in the following claims.

I claim:

1. An electrical condenser comprising a stack having a series of conducting sheets alternating with larger thin and unitary dielectric sheets, the respective series of sheets above mentioned being disposed substantially in line, with each conducting sheet overlapped on all sides by the adjacent dielectric sheets, and the conducting sheets being all electrically isolated, and conducting plates at the opposite ends of said series of alternating sheets, which last-named conducting plates have circuit connections leading respectively thereto, to make up a condenser unit, and a sufficient number of said isolated sheets being employed in said unit to reduce the potential strain per dielectric sheet to a value below the brush discharge point.

2. An electrical condenser comprising a stack having a series of conducting sheets alternating with larger thin and unitary dielectric sheets, the respective series of sheets above mentioned being disposed substantially in line, with each conducting sheet overlapped on all sides by the adjacent dielectric sheets, and the conducting sheets being all electrically isolated, a metallic clamp surrounding said stack and compressing its opposite ends, and circuit connections being made to points along the stack which avoid high strains between the clamp and the respective end sheets of the stack.

3. An electrical condenser comprising a stack having a series of conducting sheets alternating with larger thin and unitary dielectric sheets, the respective series of sheets above mentioned being disposed substantially in line, with each conducting sheet overlapped on all sides by the adjacent dielectric sheets, and the conducting sheets being all electrically isolated, conducting plates being disposed at spaced intermediate points along the stack and having opposite circuit connections leading thereto, and a metallic clamp surrounding the stack, whereby the isolated sheets between the conducting plates are in parallel with the isolated sheets which are between the respective conducting plates and the ends of the stack.

4. An electrical condenser comprising a stack having a plurality of series of conducting sheets alternating with larger thin and unitary dielectric sheets, the respective conducting and dielectric sheets of said series being disposed substantially in line with each conducting sheet overlapped on all sides by the adjacent dielectric sheets and the conducting sheets being all electrically isolated, a conducting plate interposed between adjacent series of sheets, said conducting plate having a circuit connection leading thereto, and a metallic clamp compressing said stack, the clamp being in good conductive relation to the respective end isolated sheets of said stack.

5. An electrical condenser made of dielectric sheets and conducting plates in intimate contact with each other, all the conducting plates having about the same surface area and some being isolated, a clamp maintaining all said sheets and plates under pressure, and a terminal interposed within the stack of plates.

6. An electrical condenser made of dielectric sheets and conducting plates, said sheets and plates in intimate contact with each other, all the conducting plates having about the same surface area, and some being isolated, and a terminal interposed within the stack of plates and connected in an electric circuit.

7. An electrical condenser made of dielectric sheets and conducting plates in intimate contact with each other, all the conducting plates having about the same surface area and some being isolated, a clamp maintaining all said sheets and plates under pressure, and terminals interposed in various positions within the stack of plates.

8. An electrical condenser made of dielectric sheets and conducting plates, said sheets and plates in intimate contact with each other, all the conducting plates having about the same surface area, and some being isolated, and terminals interposed in various positions within the stack of plates and connected in an electric circuit.

9. An electrical condenser comprising a casing, a stack of unit condensers contained therein, said units being arranged in series, a clamp for said stack comprising an integral metallic member contained within the casing extending entirely around the stack, and means associated with said metallic member for exerting compression on the stack.

10. An electrical condenser comprising a casing, a stack of unit condensers contained therein, a clamp for said stack comprising a member contained within the casing and extending around the stack, means associated with said clamp for exerting compression on the stack and means electrically connecting the end units to said clamp member.

11. An electrical condenser comprising a casing, a stack of unit condensers contained therein, said units being connected in series, a clamp extending entirely around the stack, means associated with said clamp for exerting compression on the stack; a connection between the ends of said stack and said clamp, and terminals extending from said stack.

12. An electric condenser made up of thin mica sheets interleaved with conducting plates, terminal connections leading respectively to conducting plates which are separated by a series of other conducting plates, the adjacent plates of said series differing progressively in potential from one terminal plate to the other, said condenser being impregnated with an insulating compound but being under sufficient compression to effect intimate contact substantially throughout, between the mica sheets and the conducting plates.

13. An electrical condenser comprising a plurality of insulating and conducting sheets divided into a plurality of sections, each section forming a unit condenser and comprising a plurality of conducting plates having terminals and a plurality of conducting plates isolated from each other and the plates with terminals, connections between said unit condensers whereby the same are arranged in parallel circuit with the main connections to the condenser.

14. An electric condenser comprising a metallic casing, a stack of unit condensers contained therein, a clamp for said stack interposed between the same and the casing, a sheet mica cover for the casing, and means for suspending the condenser stack and clamp from said cover.

15. An electric condenser comprising a metal casing, a stack of unit condensers contained within said casing with the laminations of the stack disposed substantially parallel to the side walls thereof, a clamp for the condenser stack interposed between the same and the side walls of the casing, a sheet mica cover extending across the open side of the casing, and a plurality of metal straps secured to said cover and to said clamp for suspending the stack and clamp from the cover.

16. An electric condenser made up of thin unitary sheets of mica interleaved with conducting plates, the mica sheets overlapping said plates on all sides, and terminal connections being provided to certain of said conducting plates which are separated by a series of other conducting plates, whereby such other conducting plates are electrically isolated, said terminally connected plates being disposed in intermediate portions of the condenser and a metallic clamp in inductive relation to both of the end plates of said condenser.

In testimony that I claim the foregoing, I have hereunto set my hand this 9th day of May, 1921.

WILLIAM DUBILIER.